United States Patent
Connor

(10) Patent No.: US 10,120,385 B2
(45) Date of Patent: Nov. 6, 2018

(54) COMFORT RIDE VEHICLE CONTROL SYSTEM

(71) Applicant: Intel Corporation, Santa Clara, CA (US)

(72) Inventor: Patrick L. Connor, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/085,756

(22) Filed: Mar. 30, 2016

(65) Prior Publication Data

US 2017/0285646 A1 Oct. 5, 2017

(51) Int. Cl.
*G05D 1/02* (2006.01)
*B60W 30/02* (2012.01)
*B60W 40/04* (2006.01)
*G01S 17/93* (2006.01)
*G01S 15/93* (2006.01)
*G01S 13/93* (2006.01)

(52) U.S. Cl.
CPC ......... *G05D 1/0214* (2013.01); *B60W 30/025* (2013.01); *B60W 40/04* (2013.01); *G01S 13/931* (2013.01); *G01S 15/931* (2013.01); *G01S 17/936* (2013.01)

(58) Field of Classification Search
None
See application file for complete search history.

(56) References Cited

U.S. PATENT DOCUMENTS

| 4,809,178 A * | 2/1989 | Ninomiya | G05D 1/0255 318/587 |
| 6,539,294 B1 * | 3/2003 | Kageyama | E02F 3/842 180/168 |
| 7,729,840 B2 * | 6/2010 | Nishira | B60T 7/22 701/300 |
| 7,966,127 B2 * | 6/2011 | Ono | B60R 21/0134 701/300 |

(Continued)

FOREIGN PATENT DOCUMENTS

JP 2003276538 10/2003

OTHER PUBLICATIONS

"International Application Serial No. PCT/US2017/018565, International Search Report dated May 15, 2017", 3 pgs.

(Continued)

*Primary Examiner* — Redhwan K Mawari
*Assistant Examiner* — Edward Torchinsky
(74) *Attorney, Agent, or Firm* — Schwegman Lundberg & Woessner, P.A.

(57) ABSTRACT

Various systems and methods for providing a vehicle control system are described herein. A system for managing a vehicle comprises: a vehicle control system of a vehicle having access to a network, including: a communication module to interface with at least one of: a mobile device, the vehicle, and environmental sensors coupled to the vehicle; and a configuration module to identify a mitigation operation to be taken when predetermined factors exist; wherein the vehicle control system is to identify a potential obstacle in a travel route of the vehicle and initiate a mitigation operation at the vehicle.

16 Claims, 4 Drawing Sheets

(56) References Cited

U.S. PATENT DOCUMENTS

| | | | | |
|---|---|---|---|---|
| 9,008,940 B2* | 4/2015 | Ueyama | ............... | B60W 30/095 |
| | | | | 340/435 |
| 9,110,169 B2* | 8/2015 | Stettner | ............... | B60R 21/0134 |
| 9,697,733 B1* | 7/2017 | Penilla | ................... | G08G 1/163 |
| 2008/0097699 A1* | 4/2008 | Ono | ................... | B60R 21/0134 |
| | | | | 701/300 |
| 2009/0033540 A1* | 2/2009 | Breed | ................... | B60N 2/2863 |
| | | | | 342/29 |
| 2009/0228184 A1* | 9/2009 | Ueyama | ............... | B60W 30/095 |
| | | | | 701/96 |
| 2013/0338878 A1 | 12/2013 | Fritz et al. | | |
| 2015/0260614 A1 | 9/2015 | Forslof | | |
| 2015/0343873 A1 | 12/2015 | Maise et al. | | |
| 2016/0274239 A1* | 9/2016 | Gupta | ................... | G01S 17/936 |
| 2017/0113702 A1* | 4/2017 | Thieberger-Navon | ........................ | |
| | | | | B60W 50/14 |

OTHER PUBLICATIONS

"International Application Serial No. PCT/US2017/018565, Written Opinion dated May 15, 2017", 11 pgs.

* cited by examiner

COMFORT RIDE VEHICLE CONTROL SYSTEM

TECHNICAL FIELD

Embodiments described herein generally relate to vehicle controls and in particular, to a vehicle control system to provide a comfortable ride.

BACKGROUND

Autonomous vehicles, also referred to as self-driving cars, driverless cars, uncrewed vehicles, or robotic vehicles, are vehicles capable of replacing traditional vehicles for conventional transportation. Elements of autonomous vehicles have been introduced slowly over the years, such as through the use of advanced driver assistance systems (ADAS). ADAS are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
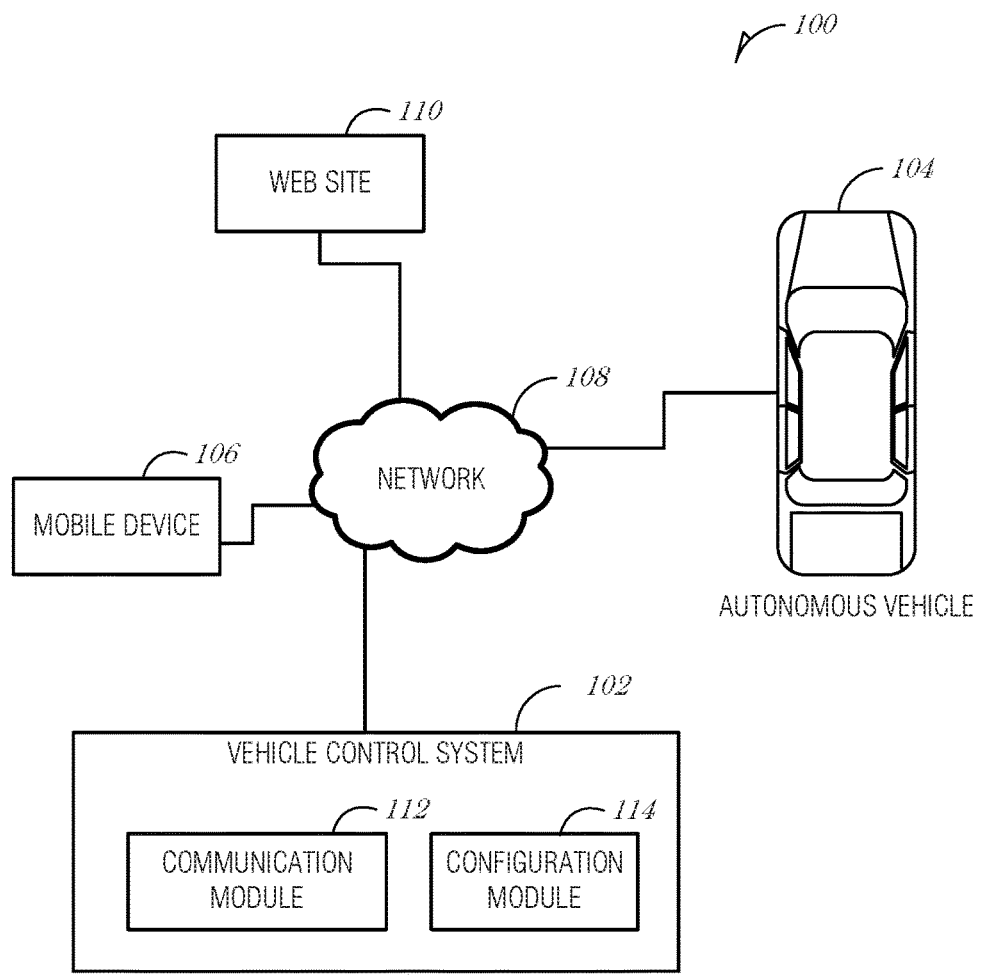
FIG. 1 is a schematic drawing illustrating a system to control an autonomous vehicle, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Systems and methods described herein provide mechanisms to manage autonomous vehicles in order to provide a more comfortable ride to the passengers. Roads are far from perfectly smooth. Rocks, cracks, manholes, access covers, potholes, and other obstacles litter the streets and highways. Driver assist systems do not currently have the data or intelligence to navigate these obstacles. Avoiding such obstacles would provide a more comfortable ride, while also reducing wear and tear on the vehicle.

The disclosure provides various advantages and features that complement each other. The first aspect is bump prediction and mitigation, which allows the active vehicle to monitor one or more vehicles ahead of it and watch for signs that the leading vehicle(s) hit a bump, pothole, or other obstruction. In many cases, there is a distinctive detectable motion when a vehicle hits a bump, pothole, etc. By watching the lead vehicle(s) the system provides an improvement over existing camera-based systems, which may be unable to detect road obstacles (e.g., when a pothole is filled with water). Instead, by observing the lead vehicle's motion and behavior, the active vehicle (trailing vehicle) is able to respond autonomously. The active vehicle may respond using various mechanisms, such as by slowing down, raising the suspension, softening the suspension, or steering around the obstacle.

A second aspect is lane placement. When a pothole or other road obstruction is detected, either by camera, radar, monitoring the lead vehicle, past experience, or from a cloud source/data sharing, then the active vehicle may navigate around the obstruction while maintaining the correct lane of travel. Minor adjustments in steering may be used to gradually swerve the vehicle in a manner to avoid the obstacle while also maintaining the correct lane of travel. The vehicle may begin to make this track alteration well before the obstacle may even be detected by sensors on the vehicle. This is possible if the vehicle has been informed of the obstacle either by a prior encounter or by a service that provides a database of obstacle locations.

A third aspect is crowd sourcing and data sharing. When an obstacle is detected (e.g., by camera, radar, sonar, or by a jolt to the suspension of the active vehicle), the location is collected and uploaded to a service. The information about the obstruction may include the GPS coordinates, lane, lane direction, lane placement, type of obstruction, size, severity, date and time of observation, and the like. The service may be provided to other vehicles in the region to be informed about potential obstacles in their routes.

If the obstacle is not avoidable, such as a steel plate in the road, or rail road tracks, then the magnitude of jolt from the object crossing is measured by the suspension. The data is shared and other approaching vehicles may adjust their speed based on the jolt magnitude of previous impacts. E.g., smooth rail crossings would result in little to no slowdown, whereas poorly maintained crossings would call for suspension adjustments and speed reduction. With this crowd sourcing feature, a vehicle is be able to make such a crossing at the optimal settings and speeds even on its first encounter with the obstacle. An actively maintained obstacle database is valuable for autonomous and semi-autonomous vehicles.

FIG. 1 is a schematic drawing illustrating a system 100 to control an autonomous vehicle, according to an embodiment. FIG. 1 includes a vehicle control system 102, an autonomous vehicle 104, and a mobile device 106, communicatively coupled via a network 108.

The autonomous vehicle 104 may be of any type of vehicle, such as a commercial vehicle, consumer vehicle, or recreation vehicle able to operate at least partially in an autonomous mode. The autonomous vehicle 104 may operate at some times in a manual mode where the driver operates the vehicle 104 conventionally using pedals, steering wheel, and other controls. At other times, the autonomous vehicle 104 may operate in a fully autonomous mode, where the vehicle 104 operates without user intervention. In addition, the autonomous vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

The vehicle 104 includes a sensor array, which may include various forward, side, and rearward facing cameras, radar, LIDAR, ultrasonic, or similar sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some forward-facing cameras may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of a forward-facing camera. Side-facing sensors are those that are directed outward from the sides of the vehicle. Cameras in the sensor array may include infrared or visible light cameras, able to focus at long-range or short-range with narrow or large fields of view.

The autonomous vehicle 104 includes an on-board diagnostics system to record vehicle operation and other aspects of the vehicle's performance, maintenance, or status. The autonomous vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

The mobile device 106 may be a device such as a smartphone, cellular telephone, mobile phone, laptop computer, tablet computer, or other portable networked device. In general, the mobile device 106 is small and light enough to be considered portable and includes a mechanism to connect to a network 108, either over a persistent or intermittent connection.

The network 108 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 108 may include a single local area network (LAN) or wide-area network (WAN), or combinations of LANs or WANs, such as the Internet. The various devices (e.g., mobile device 106 or vehicle 104) coupled to the network 108 may be coupled to the network 108 via one or more wired or wireless connections.

The network 108 may also include in-vehicle networks, such as an on-board diagnostic network (e.g., OBD II), CANbus, Bluetooth, Ethernet, or other in-vehicle, short-range, small-area, or personal network.

The vehicle control system 102 may include a communication module 112 to interface with the mobile device 106 or the autonomous vehicle 104 and pass control and data to monitor environmental events, vehicle activity, vehicle status, geographical location, and the like. The vehicle control system 102 may use the communication module 112 to communicate with sensors on the autonomous vehicle 104 to gather information about the road surface, weather events, time of day, location, route, other vehicles in the area, or the like. Using this data, the vehicle control system 102 is able to determine potential obstacles in the road and initiate mitigation operations, such as braking, steering, or alerting the driver. The communication module 112 may operate over the network 108 and may access the web site 110 to acquire data about potential obstacles along the route of the autonomous vehicle 104. The communication module 112 may also upload data about experiences at the autonomous vehicle 104 (e.g., after experiencing a pothole, data describing the pothole may be uploaded to the web site 110 to update an obstacle database).

The vehicle control system 102 may also include a configuration module 114. The driver may configure the vehicle control system 102 to react in certain ways depending on the type, severity, location, or other aspects of the potential obstacles, traffic, or other environmental factors. The driver's configuration may be stored in or accessed by the configuration module 114. Different drivers may store different driver preferences (e.g., a husband may store one set of preferences and his wife may store a different set of preferences), each of which may be accessed by the configuration module 114 to configure the vehicle control system 102. The configuration module 114 may present, or cause to be presented, a user interface to the driver or other occupant of the autonomous vehicle 104 with various user interface controls, such as drop down menus, check boxes, lists, or other suitable user interface elements, such that the driver or other occupant may select a type of potential obstacle (e.g., rough road surface, pothole, curb, person/animal, etc.) and a corresponding responsive action (e.g., alarm, brake, steering control, log, etc.).

In operation, the autonomous vehicle 104 may operate in one or multiple modes including a reactive mode and a preemptive mode. In the reactive move, the autonomous vehicle 104 uses various sensors in the sensor array to detect potential obstacles in the path of travel and acts to reduce or eliminate the obstacles' effects on the vehicle's ride. For example, the autonomous vehicle 104 may sense a pothole in the road ahead and actively assist the steering of the autonomous vehicle 104 to avoid the pothole. Various types of responsive actions may be used alone or in combination, such as active steering, reduction or increasing speed, notifying the driver or other occupant, adjusting vehicle suspension properties to reduce impact forces felt in the cabin of the autonomous vehicle 104, pre-tensioning seatbelts, etc. Thus, the autonomous vehicle 104 in reactive mode is able to detect objects and obstacles and reduce or eliminate their effects on the passengers in the autonomous vehicle 104.

In reactive mode, the autonomous vehicle 104 may also sense and monitor other types of activities, such as a lead vehicle's operation (e.g., sensing brake lights or swerving of a vehicle in front of the autonomous vehicle 104), approaching vehicles' operation, pedestrian's activity, bicyclists, and the like, to detect and infer potential hazards or obstacles in the roadway.

In preemptive mode, the autonomous vehicle 104 is able to access a repository of road hazards or obstacles and take preemptive action to reduce or eliminate their effect on the autonomous vehicle 104 or its passengers. The repository may be hosted in a shared network location (e.g., web site 110, a cloud location, a distributed database, etc.) or be locally hosted (e.g., in the vehicle 104 or in the mobile device 106). The repository may include a location of the obstacle (e.g., GPS coordinates, street intersection, mile marker, etc.), a description or type of the obstacle (e.g., pothole, manhole cover, uneven pavement, etc.), a severity of the obstacle (e.g., rated from 1 to 10 on a scale of dangerousness), source (e.g., from the driver, from a vehicle sensor, from an online user in a crowdsourced context, etc.), and other properties of the obstacle. Using this data, the autonomous vehicle 104 is able to gently and subtly change the operation of the autonomous vehicle 104 to provide a smooth and comfortable ride for the passengers.

As an example, in the United States, the highway system uses a 12-foot standard lane width. While lane widths may vary based on the type of road, volume and speed of traffic on such roads, and other aspects, lane widths are typically wide enough to allow adjustments for a passenger vehicle to maneuver around small obstacles. As such, when the autonomous vehicle 104 approaches an obstacle (whether in reactive or preemptive mode), the autonomous vehicle 104 may slow down and use lane assistance technologies to gently swerve the autonomous vehicle 104 in order to avoid the obstacle, while staying in the proper driving lane.

Figure 2:
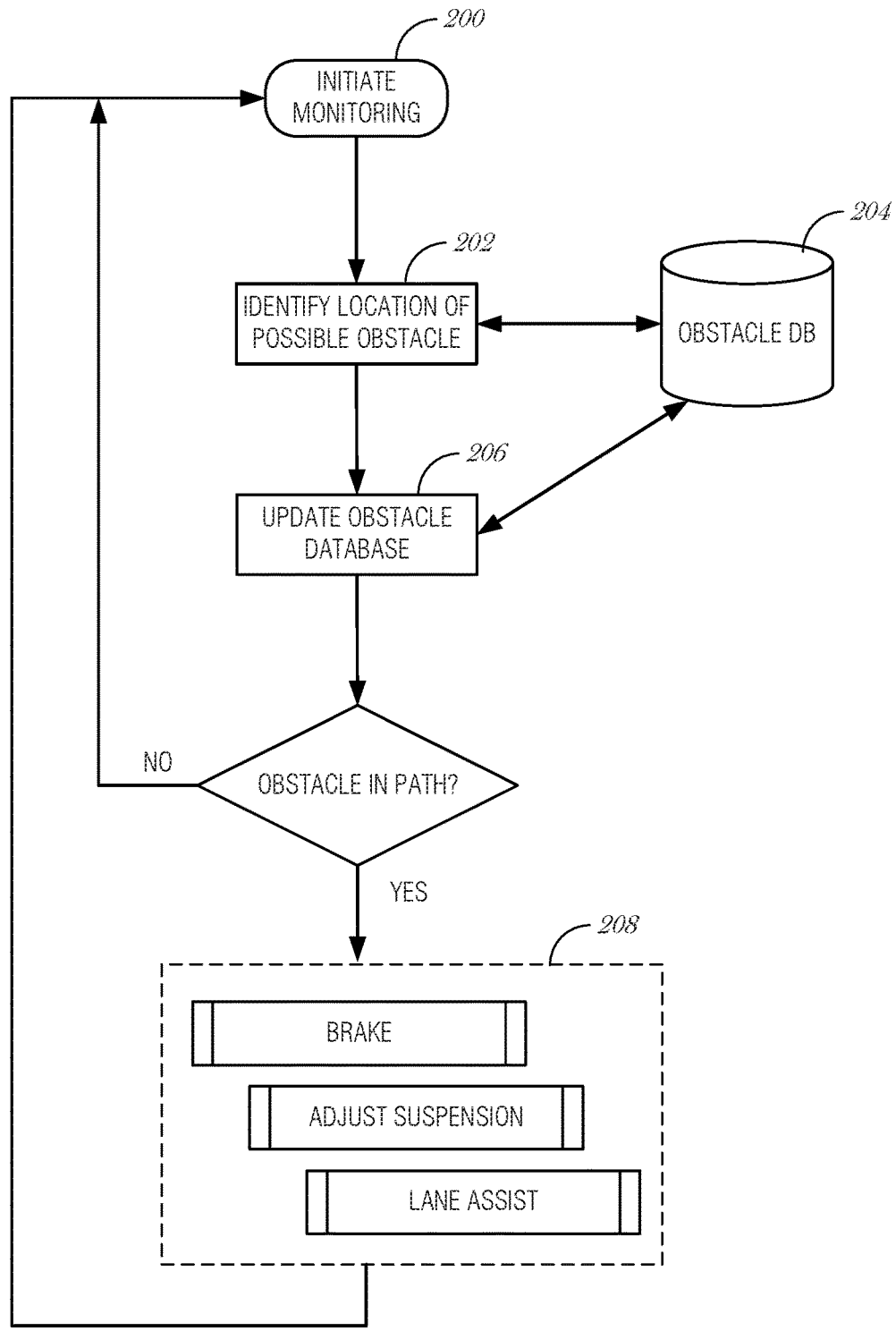
FIG. 2 is a data flow diagram illustrating a process and system to provide a comfortable ride in an autonomous vehicle, according to an embodiment.

FIG. 2 is a data flow diagram illustrating a process and system to provide a comfortable ride in an autonomous vehicle, according to an embodiment. At operation 200, the data and control flow initiate and the vehicle begins monitoring its environment. Monitoring may be implemented, at least in part, using sensors installed on or in the vehicle. The vehicle may monitor its current geolocation using a location based system (e.g., GPS), planned route, current direction of travel, and the like to identify portions of the travel path that are likely to have been traversed. Monitoring may be used in a reactive mode in order for the vehicle to respond in substantially real time to obstacles sensed in the path of travel. Monitoring may also be used in a preemptive mode to determine from previously known information whether the vehicle is likely to encounter an obstacle.

The data collected during operation of the autonomous vehicle may be related to the vehicle's performance, such as acceleration, deceleration, gyrometer, seat sensor data, steering data, and the like. The data may also be related to the vehicle's occupants, operating environment, use, or the like.

At operation 202, the vehicle identifies a location of a possible obstacle. In a reactive mode, the vehicle may identify the possible obstacle using sensors on the vehicle. For example, the vehicle may use a visible light camera to identify a dark object in the road in front of the vehicle. Using image analysis, the vehicle control system 102 may determine that the shape of the dark object is consistent with a pothole or manhole depression. Other sensors, such as LIDAR or radar, may be used to confirm or verify the initial identification. Additionally, after the vehicle traverses the possible obstacle, other sensors may be used to verify or confirm the existence, severity, or identification of the possible obstacle. For example, accelerometers placed in the wheels of a vehicle may be used to determine the approximate location, size, depth, and other characteristics of an obstacle. The data sensed at the time of traversing the obstacle may be stored and shared with other motorists. Such data may also be used to improve the classification algorithms used to detect obstacles in the first instance.

As discussed above, in a reactive mode the vehicle may sense the behavior of other vehicles on the road to determine whether a potential obstacle exists in the roadway. Radar, LIDAR, image analysis, or other mechanisms may be used to detect actions of a vehicle in front of the present vehicle. When a leading vehicle swerves to avoid an obstacle, bounces in reaction to hitting an obstacle, brakes suddenly, or otherwise acts in a manner that suggests there is an obstacle in the roadway in front of the lead vehicle, then the present vehicle equipped with a vehicle control system 102 may react to the lead vehicle's behavior. For example, the vehicle may swerve in a consistent direction, apply brakes, alert the driver, or take other actions. Additionally, the vehicle may observe and monitor the roadway to determine whether an obstacle exists and if so, then capture and record properties of the obstacle. If the lead vehicle happened to swerve, brake, or otherwise act in an unusual manner because of some other incident (e.g., the driver of the lead vehicle dropped their coffee or fell asleep briefly), and no obstacle was observed by the trailing vehicle, then no obstacle would be recorded.

In a preemptive mode, the vehicle may access an obstacle database 204 to determine the location, type, severity, or other characteristics of potential obstacles in the vehicle's path. The obstacle database 204 may be stored at a user device (e.g., a driver's mobile phone), in the vehicle, or at a network storage location (e.g., cloud service). Alternatively, the obstacle database 204 may be stored across several locations. For example, the driver may maintain an obstacle database that is relevant to the driver (e.g., routes or locations that are frequented by the driver) and a cloud service may maintain an obstacle database of a wider region (e.g., at a national, state, or city level). When the driver is operating within the area that is usually traveled, the local obstacle database 204 may be accessed. When the driver moves to a different location, such as on a longer trip during a vacation, the cloud-based obstacle database may be accessed by the vehicle control system 102 in order to determine potential hazards.

The obstacle database 204 may be built contemporaneously while the driver is operating the autonomous vehicle 104. For example, as obstacles are observed by the sensors, with the obstacles being in the vehicle's driving lane or another lane of traffic, either in the same direction or in another direction of travel, the vehicle may record the objects as possible obstacles and maneuver the vehicle around them in the future, verify them when on the same roadway at a later time, or share them with other motorists/vehicles for their use in a same or similar obstacle avoidance mechanism.

At operation 206, the potential obstacle is verified, further analyzed, or otherwise quantified. Updates, deletions, or other revisions to the obstacle may be made in the obstacle database 204. For example, a potential obstacle may be determined to possibly exist at a certain position in a road. After approaching the position, the sensors on the vehicle may determine that the obstacle no longer exists. Perhaps the obstacle was a pothole that was repaired, or a dead animal that was removed, or a pavement ledge that was smoothed over, or a slippery ice patch that has melted. In some cases, after a time, the obstacle may no longer exist and the obstacle database 204 may be updated to reflect such a change.

If there is an obstacle in the roadway, then the vehicle may perform one or more actions at operation 208. Actions include, but are not limited to, activating a lane assist system to avoid the obstacle, activate braking systems to reduce the impact, alert the driver or other occupants of the vehicle, activate suspension controls to soften or firm up suspension and reduce impact to the occupants (e.g., the suspension may be firmed up when lane assist swerved in order to reduce body roll, or may be softened when the impact is unavoidable in order to reduce shock to the cabin occupants), activate traction control systems to improve handling, and the like.

Figure 3:
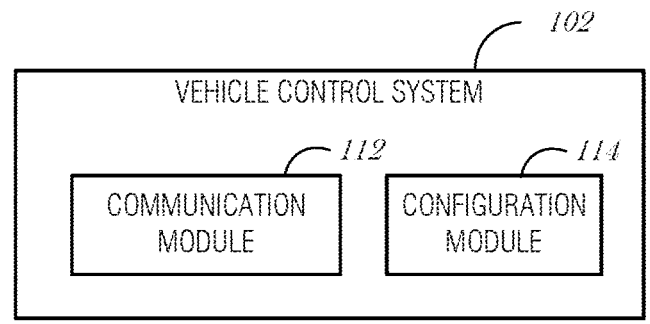
FIG. 3 is a block diagram illustrating a system for managing an autonomous vehicle, according to an embodiment.

FIG. 3 is a block diagram illustrating a system for managing an autonomous vehicle, according to an embodiment. The system includes a vehicle control system 102 to identify a potential obstacle in a travel route of the vehicle and initiate a mitigation operation at the vehicle.

In an embodiment, to identify the potential obstacle, the vehicle control system 102 is to access a database of obstacles, each obstacle including a geographical position and identify the potential obstacle using the geographical position of the potential obstacle and a geographical position of the vehicle. In a further embodiment, the database of obstacles is populated, at least in part, by a community of drivers. In a related embodiment, the database of obstacles is personal to a driver of the vehicle. In another related embodiment, the database of obstacles is stored on a mobile device of a driver of the vehicle.

In an embodiment, to identify the potential obstacle, the vehicle control system 102 is to access sensor data from a sensor array installed on the vehicle and identify the potential obstacle based on the sensor data. In a further embodiment, the sensor data includes image data, and to identify the potential obstacle, the vehicle control system 102 is to use an image classifier to identify the potential obstacle.

In an embodiment, the potential obstacle is a pothole, a manhole cover, a pavement crack, or a pavement bump. Other types of obstacles are included in the scope of this disclosure, such as dead animals, ice patches, rocks, and the like.

In an embodiment, to identify the potential obstacle, the vehicle control system 102 is to monitor a preceding vehicle in front of the vehicle, detect a movement of the preceding vehicle, the movement indicative of the potential obstacle, and infer the existence of the potential obstacle from the movement of the preceding vehicle. Thus, as the vehicle is moving, it may react to the preceding vehicle's behavior or movement. In an embodiment, the movement of the preceding vehicle includes slowing down. In a related embodiment, the movement of the preceding vehicle includes a body impact motion. For example, the body impact motion may be tires bouncing or a body bouncing indicative of passing over a bump or a pothole.

In an embodiment, the mitigation operation includes plotting a trajectory of the vehicle to avoid the potential obstacle and guiding the vehicle using the trajectory. The plotting may be performed in real time or may be predesignated, for example, based on a previous traversal of the roadway.

In an embodiment, the mitigation operation includes alerting a passenger of the vehicle of the potential obstacle. The alert may be presented on an in-vehicle infotainment system, the passenger's mobile device, or via a wearable device worn by a passenger, in various examples.

In an embodiment, the mitigation operation included applying brakes to slow the vehicle down and reduce the impact of the vehicle with the potential obstacle. Even a 4-5 mile per hour reduction in speed is enough to reduce the severity of the jolt felt while traversing a pothole.

In an embodiment, the mitigation operation includes adjusting a suspension setting of the vehicle to reduce the impact of the vehicle with the potential obstacle. The suspension may be softened to reduce how much force is transmitted to the passenger cabin.

In an embodiment, the mitigation operation includes adjusting a suspension setting of the vehicle to reduce body roll of the vehicle and guiding the vehicle around the potential obstacle. In this situation, the increased stiffness of the vehicle's suspension helps to reduce body roll, which increases the comfort level for the passengers.

In an embodiment, the vehicle control system 102 is to validate the potential obstacle as an actual obstacle before engaging the mitigation operation. For example, the vehicle control system 102 may be aware of a potential obstacle in the road, but due to its type the obstacle may no longer exist (e.g., an icy patch or a fallen rock). As such, using sensors such as cameras or radar, the vehicle control system 102 may verify the existence of the potential obstacle before performing mitigation operations.

In an embodiment, the vehicle control system 102 is to save the potential obstacle to an obstacle database. As the vehicle encounters new obstacles or revisits obstacles that have changed, the vehicle control system 102 may update the obstacle database with appropriate information. The obstacle information may be shared amongst other drivers so that their vehicles may also make adjustments to provide comfortable and safe rides. Thus, in a related embodiment, the obstacle database is stored in a cloud service available to other drivers.

Figure 4:
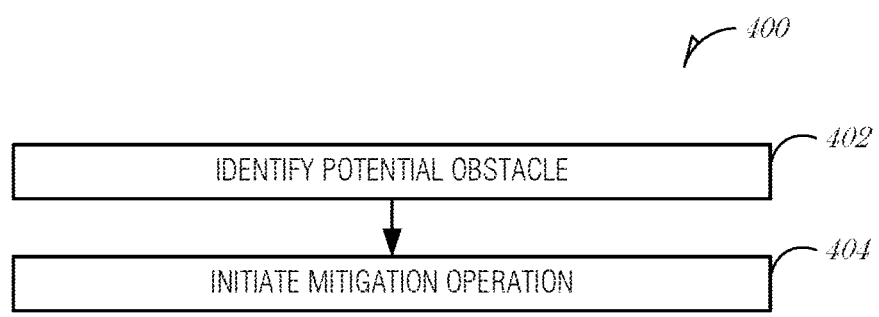
FIG. 4 is a flowchart illustrating a method of managing an autonomous vehicle, according to an embodiment.

FIG. 4 is a flowchart illustrating a method 400 of managing an autonomous vehicle, according to an embodiment. At block 402, a potential obstacle in a travel route of the vehicle is identified at an onboard vehicle control system in a vehicle. In embodiments, the potential obstacle is a pothole, a manhole cover, a pavement crack, or a pavement bump.

At block 404, a mitigation operation is initiated at the vehicle. In an embodiment, identifying the potential obstacle comprises accessing a database of obstacles, each obstacle including a geographical position and identifying the potential obstacle using the geographical position of the potential obstacle and a geographical position of the vehicle. In a further embodiment, the database of obstacles is populated, at least in part, by a community of drivers. In a related embodiment, the database of obstacles is personal to a driver of the vehicle. In another related embodiment, the database of obstacles is stored on a mobile device of a driver of the vehicle.

In an embodiment, identifying the potential obstacle comprises accessing sensor data from a sensor array installed on the vehicle and identifying the potential obstacle based on the sensor data. In a further embodiment, the sensor data includes image data, and wherein identifying the potential obstacle comprises using an image classifier to identify the potential obstacle.

In an embodiment, identifying the potential obstacle comprises monitoring a preceding vehicle in front of the vehicle, detecting a movement of the preceding vehicle, the movement indicative of the potential obstacle, and inferring the existence of the potential obstacle from the movement of the preceding vehicle. In a further embodiment, the movement of the preceding vehicle includes slowing down. In a related embodiment, the movement of the preceding vehicle includes a body impact motion.

In an embodiment, the mitigation operation comprises plotting a trajectory of the vehicle to avoid the potential obstacle and guiding the vehicle using the trajectory. In an embodiment, the mitigation operation comprises alerting a passenger of the vehicle of the potential obstacle. In an embodiment, the mitigation operation comprises applying brakes to slow the vehicle down and reduce the impact of the vehicle with the potential obstacle. In an embodiment, the mitigation operation comprises adjusting a suspension setting of the vehicle to reduce the impact of the vehicle with the potential obstacle. In an embodiment, the mitigation operation comprises adjusting a suspension setting of the vehicle to reduce body roll of the vehicle and guiding the vehicle around the potential obstacle.

In an embodiment, the method 400 includes validating the potential obstacle as an actual obstacle before engaging the mitigation operation.

In an embodiment, the method 400 includes saving the potential obstacle to an obstacle database. In a further embodiment, the obstacle database is stored in a cloud service available to other drivers. The obstacle database may be proprietary or company-owned, or otherwise semi-privately held, so that the data in the obstacle database is provided to drivers that are associated with the company, subscribe to the database, etc. For example, a shipping company may maintain an obstacle database and make it available to route drivers.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
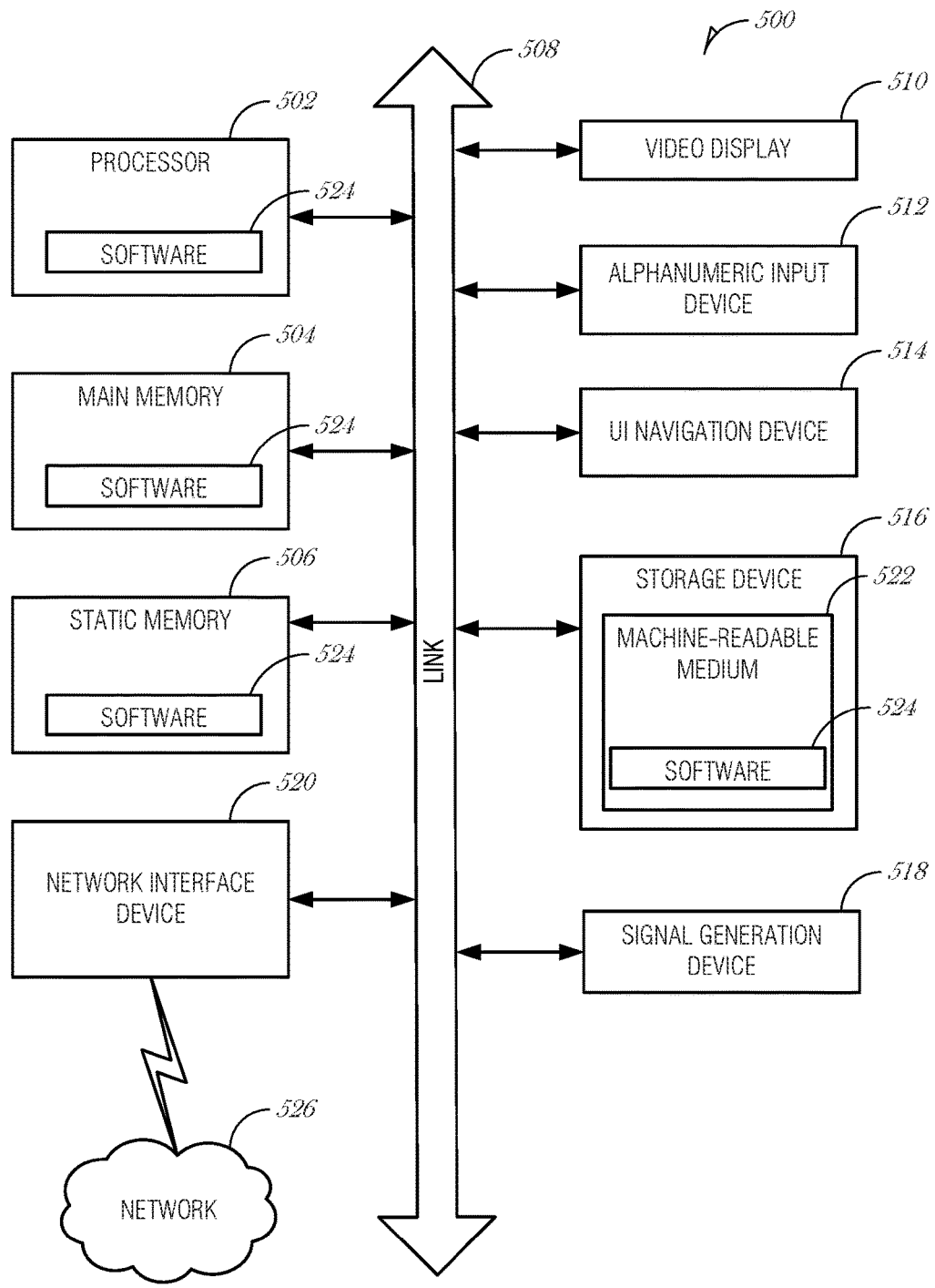
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for managing a vehicle (such as a device, apparatus, or machine) comprising: a vehicle control system of a vehicle having access to a network, including: a communication module to interface with at least one of: a mobile device, the vehicle, and environmental sensors coupled to the vehicle; and a configuration module to identify a mitigation operation to be taken when predetermined factors exist; wherein the vehicle control system is to identify a potential obstacle in a travel route of the vehicle and initiate a mitigation operation at the vehicle.

In Example 2, the subject matter of Example 1 may include, wherein to identify the potential obstacle, the vehicle control system is to: access a database of obstacles using the communication module, each obstacle including a geographical position; and identify the potential obstacle using the geographical position of the potential obstacle and a geographical position of the vehicle.

In Example 3, the subject matter of any one of Examples 1 to 2 may include, wherein the database of obstacles is populated, at least in part, by a community of drivers.

In Example 4, the subject matter of any one of Examples 1 to 3 may include, wherein the database of obstacles is personal to a driver of the vehicle.

In Example 5, the subject matter of any one of Examples 1 to 4 may include, wherein the database of obstacles is stored on a mobile device of a driver of the vehicle.

In Example 6, the subject matter of any one of Examples 1 to 5 may include, wherein to identify the potential obstacle, the vehicle control system is to: access sensor data from a sensor array installed on the vehicle using the communication module; and identify the potential obstacle based on the sensor data.

In Example 7, the subject matter of any one of Examples 1 to 6 may include, wherein the sensor data includes image data, and wherein to identify the potential obstacle, the vehicle control system is to use an image classifier to identify the potential obstacle.

In Example 8, the subject matter of any one of Examples 1 to 7 may include, wherein the potential obstacle is a pothole, a manhole cover, a pavement crack, or a pavement bump.

In Example 8, the subject matter of any one of Examples 1 to 7 may include, wherein the potential obstacle is a pothole, a manhole cover, a pavement crack, or a pavement bump.

In Example 9, the subject matter of any one of Examples 1 to 8 may include, wherein to identify the potential obstacle, the vehicle control system is to: access data from the environmental sensors via the communication module to monitor a preceding vehicle in front of the vehicle; detect a movement of the preceding vehicle, the movement indicative of the potential obstacle; and infer the existence of the potential obstacle from the movement of the preceding vehicle.

In Example 10, the subject matter of any one of Examples 1 to 9 may include, wherein the movement of the preceding vehicle includes slowing down.

In Example 11, the subject matter of any one of Examples 1 to 10 may include, wherein the movement of the preceding vehicle includes a body impact motion.

In Example 12, the subject matter of any one of Examples 1 to 11 may include, wherein the mitigation operation comprises: plotting a trajectory of the vehicle to avoid the potential obstacle; and guiding the vehicle using the trajectory.

In Example 13, the subject matter of any one of Examples 1 to 12 may include, wherein the mitigation operation comprises: alerting a passenger of the vehicle of the potential obstacle.

In Example 14, the subject matter of any one of Examples 1 to 13 may include, wherein the mitigation operation comprises: applying brakes to slow the vehicle down and reduce the impact of the vehicle with the potential obstacle.

In Example 15, the subject matter of any one of Examples 1 to 14 may include, wherein the mitigation operation comprises: adjusting a suspension setting of the vehicle to reduce the impact of the vehicle with the potential obstacle.

In Example 16, the subject matter of any one of Examples 1 to 15 may include, wherein the mitigation operation comprises: adjusting a suspension setting of the vehicle to reduce body roll of the vehicle; and guiding the vehicle around the potential obstacle.

In Example 17, the subject matter of any one of Examples 1 to 16 may include, wherein the vehicle control system is to: validate the potential obstacle as an actual obstacle before engaging the mitigation operation.

In Example 18, the subject matter of any one of Examples 1 to 17 may include, wherein the vehicle control system is to: save the potential obstacle to an obstacle database.

In Example 19, the subject matter of any one of Examples 1 to 18 may include, wherein the obstacle database is stored in a cloud service available to other drivers.

Example 20 includes subject matter for managing a vehicle (such as a method, means for performing acts, machine readable medium including instructions that when performed by a machine cause the machine to performs acts, or an apparatus to perform) comprising: identifying at an onboard vehicle control system in a vehicle, a potential obstacle in a travel route of the vehicle; and initiating a mitigation operation at the vehicle.

In Example 21, the subject matter of Example 20 may include, wherein identifying the potential obstacle comprises: accessing a database of obstacles, each obstacle including a geographical position; and identifying the potential obstacle using the geographical position of the potential obstacle and a geographical position of the vehicle.

In Example 22, the subject matter of any one of Examples 20 to 21 may include, wherein the database of obstacles is populated, at least in part, by a community of drivers.

In Example 23, the subject matter of any one of Examples 20 to 22 may include, wherein the database of obstacles is personal to a driver of the vehicle.

In Example 24, the subject matter of any one of Examples 20 to 23 may include, wherein the database of obstacles is stored on a mobile device of a driver of the vehicle.

In Example 25, the subject matter of any one of Examples 20 to 24 may include, wherein identifying the potential obstacle comprises: accessing sensor data from a sensor array installed on the vehicle; and identifying the potential obstacle based on the sensor data.

In Example 26, the subject matter of any one of Examples 20 to 25 may include, wherein the sensor data includes image data, and wherein identifying the potential obstacle comprises using an image classifier to identify the potential obstacle.

In Example 27, the subject matter of any one of Examples 20 to 26 may include, wherein the potential obstacle is a pothole, a manhole cover, a pavement crack, or a pavement bump.

In Example 27, the subject matter of any one of Examples 20 to 26 may include, wherein the potential obstacle is a pothole, a manhole cover, a pavement crack, or a pavement bump.

In Example 28, the subject matter of any one of Examples 20 to 27 may include, wherein identifying the potential obstacle comprises: monitoring a preceding vehicle in front of the vehicle; detecting a movement of the preceding vehicle, the movement indicative of the potential obstacle; and inferring the existence of the potential obstacle from the movement of the preceding vehicle.

In Example 29, the subject matter of any one of Examples 20 to 28 may include, wherein the movement of the preceding vehicle includes slowing down.

In Example 30, the subject matter of any one of Examples 20 to 29 may include, wherein the movement of the preceding vehicle includes a body impact motion.

In Example 31, the subject matter of any one of Examples 20 to 30 may include, wherein the mitigation operation comprises: plotting a trajectory of the vehicle to avoid the potential obstacle; and guiding the vehicle using the trajectory.

In Example 32, the subject matter of any one of Examples 20 to 31 may include, wherein the mitigation operation comprises: alerting a passenger of the vehicle of the potential obstacle.

In Example 33, the subject matter of any one of Examples 20 to 32 may include, wherein the mitigation operation comprises: applying brakes to slow the vehicle down and reduce the impact of the vehicle with the potential obstacle.

In Example 34, the subject matter of any one of Examples 20 to 33 may include, wherein the mitigation operation comprises: adjusting a suspension setting of the vehicle to reduce the impact of the vehicle with the potential obstacle.

In Example 35, the subject matter of any one of Examples 20 to 34 may include, wherein the mitigation operation comprises: adjusting a suspension setting of the vehicle to reduce body roll of the vehicle; and guiding the vehicle around the potential obstacle.

In Example 36, the subject matter of any one of Examples 20 to 35 may include, validating the potential obstacle as an actual obstacle before engaging the mitigation operation.

In Example 37, the subject matter of any one of Examples 20 to 36 may include, saving the potential obstacle to an obstacle database.

In Example 38, the subject matter of any one of Examples 20 to 37 may include, wherein the obstacle database is stored in a cloud service available to other drivers.

Example 39 includes at least one machine-readable medium including instructions, which when executed by a machine, cause the machine to perform operations of any of the Examples 20-38.

Example 40 includes an apparatus comprising means for performing any of the Examples 20-38.

Example 41 includes subject matter for managing a vehicle (such as a device, apparatus, or machine) comprising: means for identifying at an onboard vehicle control system in a vehicle, a potential obstacle in a travel route of the vehicle; and means for initiating a mitigation operation at the vehicle.

In Example 42, the subject matter of Example 41 may include, wherein the means for identifying the potential obstacle comprises: means for accessing a database of obstacles, each obstacle including a geographical position; and means for identifying the potential obstacle using the geographical position of the potential obstacle and a geographical position of the vehicle.

In Example 43, the subject matter of any one of Examples 41 to 42 may include, wherein the database of obstacles is populated, at least in part, by a community of drivers.

In Example 44, the subject matter of any one of Examples 41 to 43 may include, wherein the database of obstacles is personal to a driver of the vehicle.

In Example 45, the subject matter of any one of Examples 41 to 44 may include, wherein the database of obstacles is stored on a mobile device of a driver of the vehicle.

In Example 46, the subject matter of any one of Examples 41 to 45 may include, wherein the means for identifying the potential obstacle comprises: means for accessing sensor data from a sensor array installed on the vehicle; and means for identifying the potential obstacle based on the sensor data.

In Example 47, the subject matter of any one of Examples 41 to 46 may include, wherein the sensor data includes image data, and wherein identifying the potential obstacle comprises using an image classifier to identify the potential obstacle.

In Example 48, the subject matter of any one of Examples 41 to 47 may include, wherein the potential obstacle is a pothole, a manhole cover, a pavement crack, or a pavement bump.

In Example 49, the subject matter of any one of Examples 41 to 48 may include, wherein the means for identifying the potential obstacle comprises: means for monitoring a preceding vehicle in front of the vehicle; means for detecting a movement of the preceding vehicle, the movement indicative of the potential obstacle; and means for inferring the existence of the potential obstacle from the movement of the preceding vehicle.

In Example 50, the subject matter of any one of Examples 41 to 49 may include, wherein the movement of the preceding vehicle includes slowing down.

In Example 51, the subject matter of any one of Examples 41 to 50 may include, wherein the movement of the preceding vehicle includes a body impact motion.

In Example 52, the subject matter of any one of Examples 41 to 51 may include, wherein the mitigation operation comprises: plotting a trajectory of the vehicle to avoid the potential obstacle; and guiding the vehicle using the trajectory.

In Example 53, the subject matter of any one of Examples 41 to 52 may include, wherein the mitigation operation comprises: alerting a passenger of the vehicle of the potential obstacle.

In Example 54, the subject matter of any one of Examples 41 to 53 may include, wherein the mitigation operation comprises: applying brakes to slow the vehicle down and reduce the impact of the vehicle with the potential obstacle.

In Example 55, the subject matter of any one of Examples 41 to 54 may include, wherein the mitigation operation comprises: adjusting a suspension setting of the vehicle to reduce the impact of the vehicle with the potential obstacle.

In Example 56, the subject matter of any one of Examples 41 to 55 may include, wherein the mitigation operation comprises: adjusting a suspension setting of the vehicle to reduce body roll of the vehicle; and guiding the vehicle around the potential obstacle.

In Example 57, the subject matter of any one of Examples 41 to 56 may include, means for validating the potential obstacle as an actual obstacle before engaging the mitigation operation.

In Example 58, the subject matter of any one of Examples 41 to 57 may include, means for saving the potential obstacle to an obstacle database.

In Example 59, the subject matter of any one of Examples 41 to 58 may include, wherein the obstacle database is stored in a cloud service available to other drivers.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for managing a vehicle, the system comprising:
   a vehicle control system of a vehicle having access to a network, including:
      a communication module to interface with at least one of: a mobile device, the vehicle, and environmental sensors coupled to the vehicle; and
      a configuration module to identify a mitigation operation to be taken when predetermined factors exist;
   wherein the vehicle control system is to:
      identify a potential obstacle in a travel route of the vehicle, wherein to identify the potential obstacle, the vehicle control system is to:
         access a database of obstacles using the communication module, each obstacle including a geographical position; and
         identify the potential obstacle using the geographical position of the potential obstacle and a geographical position of the vehicle;
      validate that the potential obstacle still exists using an imaging technique before engaging the mitigation operation; and
      initiate a mitigation operation at the vehicle.

2. The system of claim 1, wherein the database of obstacles is populated, at least in part, by a community of drivers.

3. The system of claim 1, wherein the database of obstacles includes information of relevant locations of a driver of the vehicle.

4. The system of claim 1, wherein the mitigation operation comprises:
   guiding the vehicle to avoid the potential obstacle.

5. The system of claim 1, wherein the mitigation operation comprises:
   alerting a passenger of the vehicle of the potential obstacle.

6. The system of claim 1, wherein the mitigation operation comprises:
   applying brakes to slow the vehicle down and reduce the impact of the vehicle with the potential obstacle.

7. The system of claim 1, wherein the mitigation operation comprises:

adjusting a suspension setting of the vehicle to reduce the impact of the vehicle with the potential obstacle.

8. The system of claim 1, wherein the mitigation operation comprises:
adjusting a suspension setting of the vehicle to reduce body roll of the vehicle; and
guiding the vehicle around the potential obstacle.

9. The system of claim 1, wherein the vehicle control system is to:
save the potential obstacle to an obstacle database.

10. The system of claim 9, wherein the obstacle database is stored in a cloud service available to other drivers.

11. A method of managing a vehicle, the method comprising:
identifying at an onboard vehicle control system in a vehicle, a potential obstacle in a travel route of the vehicle, wherein identifying the potential obstacle includes: accessing a database of obstacles, each obstacle including a geographical position, and identifying the potential obstacle using the geographical position of the potential obstacle and a geographical position of the vehicle;
validating that the potential obstacle still exists using an imaging technique before engaging the mitigation operation; and
initiating a mitigation operation at the vehicle.

12. The method of claim 11, wherein identifying the potential obstacle comprises:
accessing a database of obstacles, each obstacle including a geographical position; and
identifying the potential obstacle using the geographical position of the potential obstacle and a geographical position of the vehicle.

13. The method of claim 11, wherein the database of obstacles is populated, at least in part, by a community of drivers.

14. At least one non-transitory machine-readable medium including instructions, which when executed by a machine, cause the machine to:
identify a potential obstacle in a travel route of the vehicle, by: accessing a database of obstacles, each obstacle including a geographical position, and identifying the potential obstacle using the geographical position of the potential obstacle and a geographical position of the vehicle;
validate that the potential obstacle still exists using an imaging technique before engaging the mitigation operation; and
initiate a mitigation operation at the vehicle.

15. The at least one machine-readable medium of claim 14, wherein the instructions to identify the potential obstacle includes instructions to:
access a database of obstacles, each obstacle including a geographical position; and
identify the potential obstacle using the geographical position of the potential obstacle and a geographical position of the vehicle.

16. The at least one machine-readable medium of claim 14, wherein the mitigation operation comprises:
adjusting a suspension setting of the vehicle to reduce the impact of the vehicle with the potential obstacle.

* * * * *